United States Patent
Earnshaw et al.

(10) Patent No.: US 9,345,018 B2
(45) Date of Patent: *May 17, 2016

(54) DOWNLINK CONTROL INFORMATION SET SWITCHING WHEN USING CARRIER AGGREGATION

(71) Applicant: BlackBerry Limited, Waterloo (CA)

(72) Inventors: Andrew Mark Earnshaw, Kanata (CA); Youn Hyoung Heo, San Jose, CA (US); Zhijun Cai, Ashburn, VA (US); Mo-Han Fong, Santa Clara, CA (US); Hua Xu, Ottawa (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/805,858

(22) Filed: Jul. 22, 2015

(65) Prior Publication Data

US 2015/0333889 A1 Nov. 19, 2015

Related U.S. Application Data

(63) Continuation of application No. 14/292,458, filed on May 30, 2014, now Pat. No. 9,100,957, which is a continuation of application No. 13/457,313, filed on Apr. 26, 2012, now Pat. No. 8,780,841, which is a (Continued)

(51) Int. Cl.
*H04W 72/04* (2009.01)
*H04L 5/00* (2006.01)
(Continued)

(52) U.S. Cl.
CPC ............. *H04W 72/042* (2013.01); *H04L 5/001* (2013.01); *H04L 5/0053* (2013.01); *H04L 5/0091* (2013.01); *H04W 72/0453* (2013.01);
(Continued)

(58) Field of Classification Search
CPC ..................................................... H04W 72/082
USPC ......... 370/207, 280, 318, 319, 328, 329, 344; 455/73, 434
See application file for complete search history.

(56) References Cited

U.S. PATENT DOCUMENTS

| 893,417 A * | 7/1908 | Ausburn et al. ............... 172/175 |
| 7,260,405 B2 | 8/2007 | Kim et al. |

(Continued)

FOREIGN PATENT DOCUMENTS

| CN | 101505498 A | 8/2009 |
| CN | 101541063 A | 9/2009 |

OTHER PUBLICATIONS

3GPP TSG-RAN WG1 Meeting #58bis; "DCI Format and Blind Decoding for LTE-Advanced"; R1-093941; Miyazaki, Japan; Oct. 12-16, 2009; 5 pages.

(Continued)

*Primary Examiner* — Raj Jain
*Assistant Examiner* — Andrew C Lee
(74) *Attorney, Agent, or Firm* — Conley Rose, P.C.; J. Robert Brown, Jr.

(57) ABSTRACT

A method and apparatus for reconfiguring a user equipment configured for multi-carrier operation from a first downlink control information set to a second downlink control information set while carrier aggregation is being used, including receiving a physical downlink control channel with downlink control information formats containing a carrier indicator field.

22 Claims, 5 Drawing Sheets

Related U.S. Application Data continuation of application No. PCT/US2010/054849, filed on Oct. 29, 2010.

(60) Provisional application No. 61/256,841, filed on Oct. 30, 2009.

(51) Int. Cl.
  *H04L 27/26* (2006.01)
  *H04L 5/14* (2006.01)

(52) U.S. Cl.
  CPC ............... *H04L5/0055* (2013.01); *H04L 5/14* (2013.01); *H04L 27/2602* (2013.01)

(56) References Cited

U.S. PATENT DOCUMENTS

| | | | |
|---|---|---|---|
| 8,009,606 B2 | 8/2011 | Seo et al. | |
| 8,239,721 B2 | 8/2012 | Pelletier et al. | |
| 8,379,581 B2 | 2/2013 | Imamura | |
| 8,401,542 B2 | 3/2013 | Chung et al. | |
| 8,537,724 B2 | 9/2013 | Love et al. | |
| 8,737,346 B2* | 5/2014 | Che | H04L 1/1621 370/330 |
| 8,780,841 B2 | 7/2014 | Earnshaw et al. | |
| 8,958,366 B2 | 2/2015 | Heo et al. | |
| 9,100,957 B2 | 8/2015 | Earnshaw et al. | |
| 2009/0083424 A1* | 3/2009 | Frederiksen | G06F 15/16 709/226 |
| 2009/0088148 A1 | 4/2009 | Chung et al. | |
| 2009/0103562 A1* | 4/2009 | Frederiksen | H04W 28/18 370/468 |
| 2009/0239568 A1 | 9/2009 | Bertrand et al. | |
| 2009/0274077 A1* | 11/2009 | Meylan | H04W 28/06 370/280 |
| 2009/0300456 A1 | 12/2009 | Pelletier et al. | |
| 2009/0305698 A1* | 12/2009 | Zhang | H04L 1/0028 455/434 |
| 2009/0307554 A1 | 12/2009 | Marinier et al. | |
| 2009/0316814 A1* | 12/2009 | Seo | H04L 5/0007 375/260 |
| 2010/0034139 A1* | 2/2010 | Love | H04L 1/0029 370/328 |
| 2010/0034303 A1 | 2/2010 | Damnjanovic et al. | |
| 2010/0050039 A1* | 2/2010 | Zhang | H04L 1/1822 714/749 |
| 2010/0074230 A1* | 3/2010 | Ishii | H04W 72/1252 370/336 |
| 2010/0080187 A1 | 4/2010 | Papasakellariou et al. | |
| 2010/0111107 A1* | 5/2010 | Han | H04L 1/0038 370/472 |
| 2010/0119907 A1* | 5/2010 | Shibata | H01M 8/0247 429/432 |
| 2010/0142455 A1* | 6/2010 | Imamura | H04W 52/146 370/329 |
| 2010/0188965 A1 | 7/2010 | Cheng et al. | |
| 2010/0195614 A1* | 8/2010 | Nimbalker et al. | H04W 72/1289 370/330 |
| 2010/0227569 A1* | 9/2010 | Bala | H04L 5/0007 455/73 |
| 2010/0232373 A1 | 9/2010 | Nory et al. | |
| 2010/0238984 A1 | 9/2010 | Sayana et al. | |
| 2010/0322158 A1* | 12/2010 | Lee | H04L 5/001 370/329 |
| 2011/0044239 A1 | 2/2011 | Cai et al. | |

OTHER PUBLICATIONS

3GPP TSG RAN WG1 #58; "Control Signaling for LTE Rel-9 Enhanced DL Transmission"; R1-093408; Shenzhen, China; Aug. 24-28, 2009; 7 pages.

3GPP TSG RAN WG1 #58; "Considerations on Alternative Ways of Implementing DCI Formats for LTE-Advanced"; R1-093318; Shenzhen, China; Aug. 24-28, 2009; 2 pages.

3GPP TSG RAN WG1 Meeting #58; "Issues on Cross Carrier Scheduling"; R1-093531; Shenzhen, China; Aug. 24-28, 2009; 3 pages.

3GPP TSG RAN WG1 Meeting #58bis; "Blind Decoding for Carrier Aggregation"; R1-094117; Miyazaki, Japan; Oct. 12-16, 2009; 3 pages.

"3GPP TSG RAN WG1 Meeting #58; ""Carrier Indication for Carrier Aggregation"""; R1-093296; Shenzhen, China; Aug. 24-28, 2009; 4 pages."

3GPP TSG RAN1 #57bis; "PDCCH Design for Carrier Aggregation and Post Rel-8 Features"; R1-092641; Los Angeles, USA; Jun. 29-Jul. 3, 2009; 5 pages.

3GPP TSG RAN WG1 Meeting #58; "Way Forward on PDCCH for Bandwidth Extension in LTE-A"; R1-093699; Shenzhen, China; Aug. 24-28, 2009; 2 pages.

3GPP TSG-RAN WG1 Meeting #58; "Component Carrier Indication Scheme for Carrier Aggregation"; R1-093465; Shenzhen, China; Aug. 24-28, 2009; 3 pages.

3GPP TSG-WG2 Meeting #67bis; "Agreements on Carrier Aggregation"; R2-096292; Miyazaki, Japan; Oct. 12-16, 2009; 6 pages.

3GPP TSG-RAN WG2 Meeting #67bis; "LS on the Capability of Search on the Secondary Carrier"; R2-096295; Miyazaki, Japan; Oct. 12-16, 2009; 1 page.

3GPP TSG RAN WG2 Meeting #67-bis; "Introduction of UE Measurement Capability on Frequency Adjacent to Intra-Frequency"; R2-096045; Miyazaki, Japan; Oct. 12-16, 2009; 15 pages.

3GPP TSG-RAN2 #67bis Meeting; "The Need for Additional Activation Procedure in Carrier Aggregation"; R2-095874; Miyazaki, Japan; Oct. 12-16, 2009; 4 pages.

3GPP TSG RAN WG2 #67bis; "Initial State for the Secondary Carrier"; R2-095718; Miyazaki, Japan; Oct. 12-16, 2009; 2 pages.

3GPP TSG RAN2 Meeting #67bis; "Component Carrier Configuration/Activation for Carrier Aggregation"; R2-095576; Miyazaki, Japan; Oct. 12-16, 2009; 3 pages.

3GPP TSG RAN WG1 Meeting #57bis; "Benefits of Carrier Indicator on Multi-Channel ACK/NACK Transmission"; R1-092786; Los Angeles, CA, USA; Jun. 29-Jul. 3, 2009; 3 pages.

3GPP TSG RAN WG1 Meeting #57bis; "Benefits of Carrier Indicator on Multi-Channel ACK/NACK Transmission"; R1-092846; Los Angeles, CA, USA; Jun. 29-Jul. 3, 2009; 3 pages.

3GPP TSG RAN WG1 #58bis Meeting; "Discussion of Carrier Indicator Signalling in Carrier Aggregation Scenario"; R1-09-3767; Miyazaki, Japan; Oct. 12-16, 2009; 3 pages.

3GPP TSG RAN WG1 #58bis; "Carrier Indicator in LTE-A"; R1-094129; Miyazaki, Japan; Oct. 12-16, 2009; 2 pages.

3GPP TSG RAN WG1 #58bis; "Configuration and Activation of Carrier Indicator in PDCCH for Multiple Carrier Aggregation"; R1-094161; Miyazaki, Japan; Oct. 12-16, 2009; 6 pages.

3GPP TSG RAN WG1 #58bis; "Interpreting the Carrier Indicator Field"; R1-094206; Miyazaki, Japan; Oct. 12-16, 2009; 3 pages.

3GPP TSG RAN WG1 #58bis; "Configuration and Activation of Carrier Indicator in PDCCH for Multiple Carrier Aggregation"; R1-094353; Miyazaki, Japan; Oct. 12-16, 2009; 6 pages.

3GPP TR 36.814 V9.0.0; 3rd Generation Partnership Project; Technical Specification Group Radio Access Network; Evolved Universal Terrestrial Radio Access (E-UTRA); Further Advancements for E-UTRA Physical Layer Aspects; Release 9; Mar. 2010; 104 pages.

3GPP TS 36.212 V8.7.0; 3rd Generation Partnership Project; Technical Specification Group Radio Access Network; Evolved Universal Terrestrial Radio Access (E-UTRA); Multiplexing and Channel Coding; Release 8; May 2009; 60 pages.

3GPP TS 36.213 V8.8.0; 3rd Generation Partnership Project; Technical Specification Group Radio Access Network; Evolved Universal Terrestrial Radio Access (E-UTRA); Physical Layer Procedures; Release 8; Sep. 2009; 77 pages.

Office Action dated Jun. 3, 2014; U.S. Appl. No. 13/457,294, filed Apr. 26, 2012; 37 pages.

Notice of Allowance dated Oct. 7, 2014; U.S. Appl. No. 13/457,294, filed Apr. 26, 2012; 14 pages.

Office Action dated Apr. 23, 2014; U.S. Appl. No. 13/457,313, filed Apr. 26, 2012; 30 pages.

Notice of Allowance dated May 9, 2014; U.S. Appl. No. 13/457,313, filed Apr. 26, 2012; 14 pages.

(56) References Cited

OTHER PUBLICATIONS

Office Action dated Aug. 14, 2014; U.S. Appl. No. 14/292,458, filed May 30, 2014; 28 pages.
Final Office Action dated Jan. 14, 2015; U.S. Appl. No. 14/292,458, filed May 30, 2014; 30 pages.
Notice of Allowance dated Mar. 30, 2015; U.S. Appl. No. 14/292,458, filed May 30, 2014; 9 pages.
PCT International Search Report; Application No. PCT/US2010/054842; Apr. 21, 2011; 3 pages.
PCT Written Opinion of the International Searching Authority; Application No. PCT/US2010/054842; Apr. 21, 2011; 5 pages.
PCT International Search Report; Application No. PCT/US2010/054848; Apr. 28, 2011; 5 pages.
PCT Written Opinion of the International Searching Authority; Application No. PCT/US2010/054848; Apr. 28, 2011; 4 pages.
Canadian Office Action; Application No. 2,779,297; Aug. 22, 2013; 3 pages.
Chinese Office Action as Received in Co-pending Application No. 201080060290.9 on Aug. 5, 2014; 5 pages. (No English translation available).
Chinese Office Action as Received in Co-pending Application No. 201080060290.9 on Apr. 27, 2015; 3 pages. (No English translation available).
PCT International Search Report; Application No. PCT/US2010/054849; Mar. 31, 2011; 3 pages.
PCT Written Opinion of the International Searching Authority; Application No. PCT/US2010/054849; Mar. 31, 2011; 7 pages.
Canadian Office Action; Application No. 2,779,299; Nov. 15, 2013; 4 pages.
Chinese Office Action as Received in Co-pending Application No. 201080060288.1 on Jun. 4, 2014; 6 pages. (No English translation available).
Chinese Office Action as Received in Co-pending Application No. 201080060288.1 on Feb. 4, 2015; 3 pages. (No English translation available).
European Examination Report; Application No. 10779136.0; Jun. 8, 2015; 6 pages.
Korean Office Action as Received in Co-pending Application No. 10-2012-7014057 on Nov. 20, 2015; 4 pages.

* cited by examiner

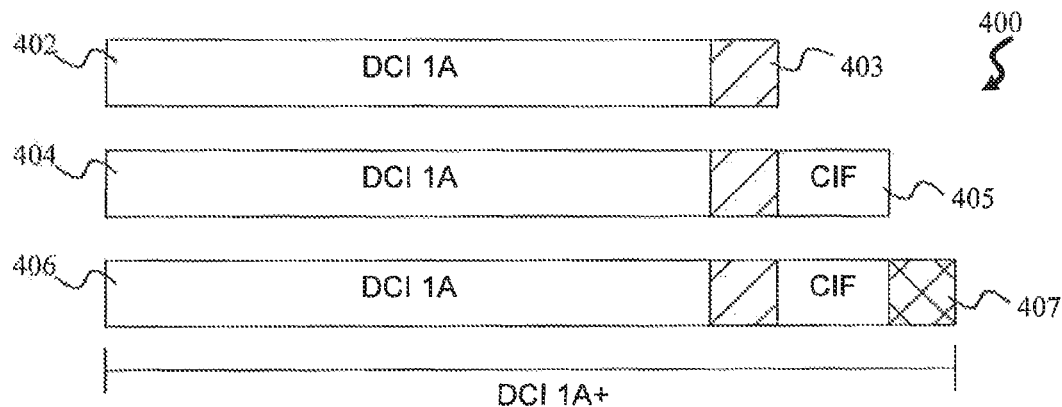
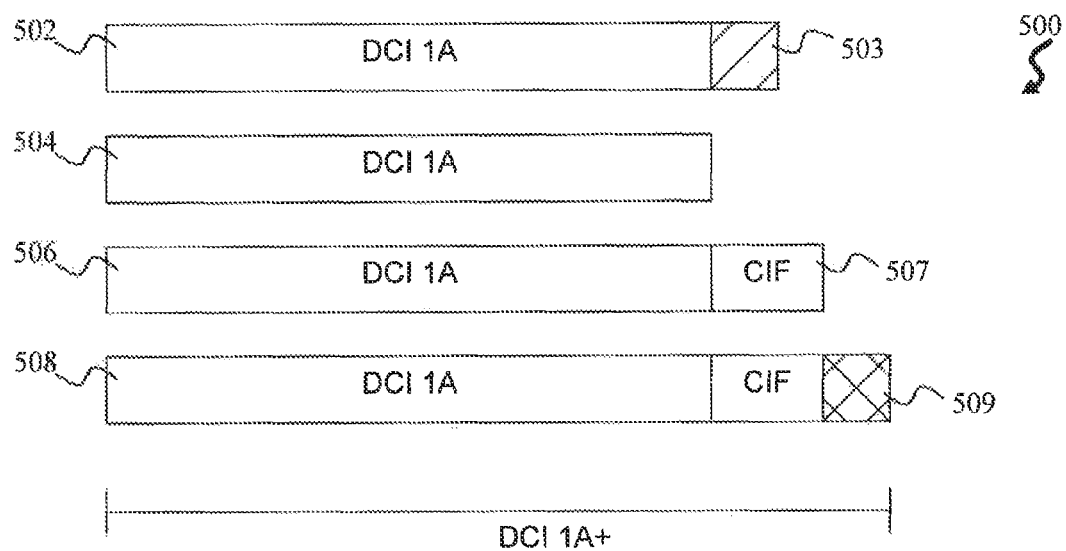

DOWNLINK CONTROL INFORMATION SET SWITCHING WHEN USING CARRIER AGGREGATION

CROSS-REFERENCE TO RELATED APPLICATIONS

This application is a continuation of U.S. patent application Ser. No. 14/292,458 now U.S. Pat. No. 9,100,957, issued on Aug. 4, 2015 and entitled, "Downlink Control Information Set Switching When Using Carrier Aggregation", which is a continuation of U.S. patent application Ser. No. 13/457,313 now U.S. Pat. No. 8,780,841, issued on Jul. 15, 2014 and entitled, "Downlink Control Information Set Switching When Using Carrier Aggregation", which is a continuation of International Application No. PCT/US2010/054849 filed Oct. 29, 2010 and entitled, "Downlink Control Information Set Switching When Using Carrier Aggregation", which claims priority to U.S. Provisional Patent Application No. 61/256,841 filed Oct. 30, 2009 and entitled, "Downlink Control Information Set Switching When Using Carrier Aggregation", all of which are incorporated by reference herein as if reproduced in their entirety.

BACKGROUND

As used herein, the terms "user equipment" ("UE"), "mobile station" ("MS"), and "user agent" ("UA") might in some cases refer to mobile devices such as mobile telephones, personal digital assistants, handheld or laptop computers, and similar devices that have telecommunications capabilities. The terms "MS," "UE," "UA," user device," and "user node" may be used synonymously herein. A UE might include components that allow the UE to communicate with other devices, and might also include one or more associated removable memory modules, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UE might consist of the device itself without such a module. In other cases, the term "UE" might refer to devices that have similar capabilities but that are not transportable, such as desktop computers, set-top boxes, or network appliances. The term "UE" can also refer to any hardware or software component that can terminate a communication session for a user.

As telecommunications technology has evolved, more advanced network access equipment has been introduced that can provide services that were not possible previously. This network access equipment might include systems and devices that are improvements of the equivalent equipment in a traditional wireless telecommunications system. Such advanced or next generation equipment may be included in evolving wireless communications standards, such as Long-Term Evolution (LTE) and LTE-Advanced (LTE-A). For example, an LTE or LTE-A system might be an Evolved Universal Terrestrial Radio Access Network (E-UTRAN) and include an E-UTRAN node B (or eNB), a wireless access point, a relay node, or a similar component rather than a traditional base station. As used herein, the term "access node" refers to any component of the wireless network, such as a traditional base station, a wireless access point, relay node, or an LTE or LTE-A node B or eNB, that creates a geographical area of reception and transmission coverage allowing a UE or a relay node to access other components in a telecommunications system. In this document, the term "access node" and "access device" may be used interchangeably, but it is understood that an access node may comprise a plurality of hardware and software.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 4 is a diagram illustrating adding a CIF field to a Release-8 DCI while retaining any existing padding bits, in accordance with an embodiment of the disclosure.

FIG. 5 is a diagram illustrating adding a CIF field to a Release-8 DCI while removing any existing padding bits, in accordance with an embodiment of the disclosure.

DETAILED DESCRIPTION

Figure 1:
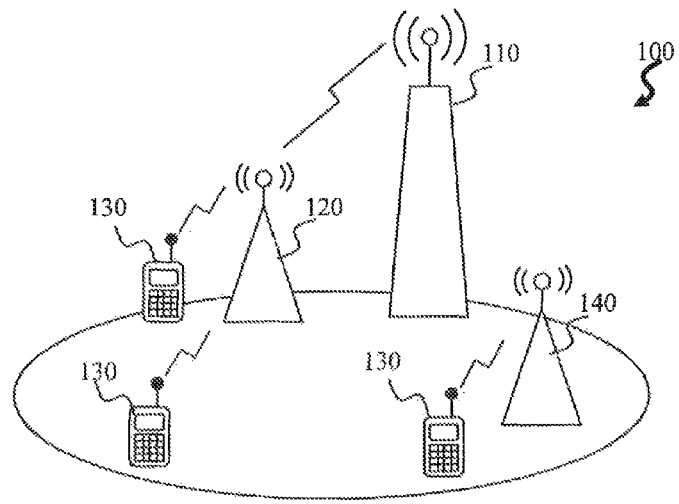
FIG. 1 is a diagram of a communication system, in accordance with an embodiment of the disclosure.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As used throughout the specification, claims, and Figures, the following acronyms have the following definitions. Unless stated otherwise, all terms are defined by and follow the standards set forth by the Third Generation Partnership Program (3GPP) technical specifications.

"ACK" is defined as "Acknowledgement."
"AM" is defined as "Acknowledged Mode."
"ARQ" is defined as "Automatic Repeat Request."
"CA" is defined as "Carrier Aggregation."
"CCE" is defined as "Control Channel Element."
"CI" is defined as "Carrier Indicator."
"CIF" is defined as "Carrier Indicator Field."
"DCI" is defined as "Downlink Control Information."
"eNB" is defined as "E-UTRAN Node B."
"FDD" is defined as Frequency Division Duplexing."
"HARQ" is defined as "Hybrid Automatic Repeat Request."
"LTE" is defined as "Long Term Evolution."
"LTE-A" is defined as "LTE-Advanced."
"MAC" is defined as "Media Access Control."

"NACK" is defined as "Negative Acknowledgement."
"PDU" is defined as "Protocol Data Unit."
"RAN" is defined as "Radio Access Network."
"Release" followed by a number refers to a version number of the 3GPP specifications.
"RLC" is defined as "Radio Link Control."
"RNTI" is defined as "Radio Network Temporary Identifier."
"RRC" is defined as "Radio Resource Control."
"PDCCH" is defined as "Physical Downlink Control Channel."
"PDCP" is defined as "Packet Data Convergence Protocol."
"PDSCH" is defined as "Physical Downlink Shared Channel."
"PUSCH" is defined as "Physical Uplink Shared Channel."
"SDU" is defined as "Service Data Unit."
"SFN" is defined as "System Frame Number."
"SRB" is defined as "Signaling Radio Bearer."
"TDD" is defined as "Time Division Duplexing."
"Tx" is defined as "Transmission."
"UE" is defined as "User Equipment."

The embodiments described herein relate to DCI set switching procedures. A DCI set is one or more discrete instances of download control link information transmitted from the eNB to the UE. A DCI set might refer to the set of non-CIF DCIs or to a set of CIF DCIs, where a non-CIF DCI does not include a Carrier Indicator Field (CIF) while a CIF DCI does include a CIF. DCI set switching refers to procedures for switching from using non-CIF DCIs to CIF DCIs, or from using CIF DCIs to non-CIF DCIs, or from using CIF DCIs with a CIF of a certain length to CIF DCIs with a different length CIF field.

Currently, issues exist with respect to DCI set switching when using carrier aggregation. In carrier aggregation, multiple component carriers might be aggregated and can be allocated in a subframe to a UE. An example of an issue that can arise with regard to DCI set switching when using carrier aggregation is to ensure that the eNB and UE do not lose contact with each other during the DCI set switching procedure. Contact might be lost as a result of errors, such as a NACK-to-ACK error. The eNB and the UE might also lose contact with each other because corresponding DCI formats in each of multiple DCI sets might have different lengths. For this reason, the eNB could be transmitting a DCI format with one length, while the UE is attempting to blind decode that DCI format with respect to a different length. These issues are described in more detail below.

The embodiments described herein provide for at least seven different techniques for addressing these and other issues. In one embodiment, an activation time may be specified such that the UE may receive an RRC command and transmit an RRC acknowledgement such that the eNB may reduce or eliminate the possibility of a NACK-to-ACK error occurring on the uplink transmission from the UE. NACK-to-ACK errors are described in detail below. The time in which the eNB might not be aware of a NACK-to-ACK error from the UE may be referred to as an uncertainty window.

In a second embodiment, the eNB might not assign resources to the UE via the PDCCH during an uncertainty window. This procedure reduces the likelihood of the UE receiving PDCCH communications that the UE cannot blind decode.

In a third embodiment, the eNB may transmit DCIs from both DCI sets during the uncertainty window. When using this technique, which DCI set the UE was currently using is less relevant, because DCIs from both sets would be present on the PDCCH.

In a fourth embodiment, a new DCI format might be provided. The new DCI format could be defined such that the UE might always search for the new DCI format on the PDCCH, regardless of the current multi-carrier configuration of the UE.

In a fifth embodiment, dual DCI set blind decoding may be performed at the UE in a technique that might be referred to as a two-way handshake. In this embodiment, the UE signals the eNB that the UE is monitoring both DCI sets so that the eNB may switch to using the new DCI set. In turn, the eNB signals the UE that the eNB is no longer transmitting the old DCI so that the UE can stop monitoring the old DCI set.

In a sixth embodiment, a specification or determination is made regarding which DCI set is to be used when ambiguous DCI lengths are present. In a seventh embodiment, a switch may be made to non-ambiguous transmission mode before switching DCI sets. Both of these embodiments are described in detail below. Furthermore, these seven embodiments are exemplary only, as additional embodiments are provided herein.

FIG. 1 illustrates an embodiment of a RAN 100, which may be a LTE or LTE-A network as described in the 3GPP specifications. FIG. 1 is exemplary and may have other components or arrangements in other embodiments. In an embodiment, RAN 100 may be an LTE-A network and may include one or more access nodes 110 and 140, one or more relay nodes (RNs) 120, and one or more UEs 130. FIG. 1 shows a second access node 140 being present. Either access node 110 or 140 may be an eNB, a base station, or other component that promote network access for the UEs 130. UEs 130 may communicate with each other via RAN 100, may communicate with the various components of the RAN 100 shown, and may also communicate with other components not shown. RAN 100 may enable a wireless telecommunications system.

Figure 2:
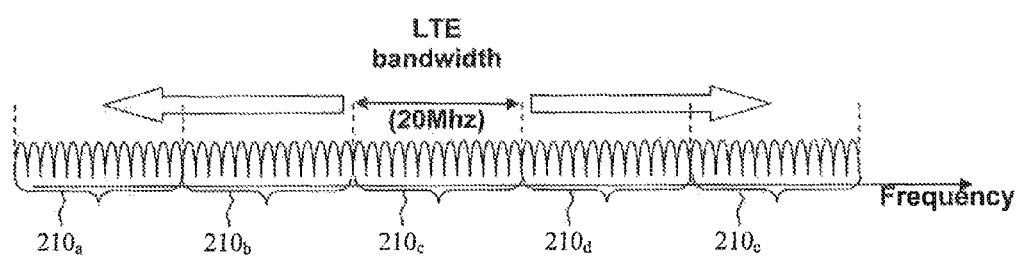
FIG. 2 is a diagram illustrating aggregation of carriers, in accordance with an embodiment of the disclosure.

FIG. 2 is a diagram illustrating aggregation of carriers, in accordance with an embodiment of the disclosure. In LTE-A, carrier aggregation might be used in order to support wider transmission bandwidths and hence increase the potential peak data rate, for example, to meet LTE-A requirements. In carrier aggregation, multiple component carriers are aggregated and can be allocated in a subframe to a UE, as shown in FIG. 2. In this example, each component carrier 210a, 210b, 210c, 210d, and 210e has a width of about 20 MHz. The total system bandwidth is about 100 MHz. It is noted that component carriers may have other bandwidths such as 10 MHz. The UE may receive or transmit on a multiple, such as up to five, of component carriers, for example, depending on the UE's capabilities. In addition, depending on the deployment scenario, carrier aggregation may occur with carriers located in the same frequency band and/or carriers located in different bands. For example, one carrier may be located at 2 GHz and a second aggregated carrier may be located at 800 MHz.

In LTE-A, one option to transmit a PDCCH in carrier aggregation is to transmit the PDCCH on a different carrier than the carrier on which the corresponding PDSCH is transmitted by using an explicit CIF. The embodiments described herein provide solutions and UE procedures to resolve various issues, including but not limited to, those related to the introduction of the explicit CIF.

One of the issues associated with carrier aggregation is design of the PDCCH. Currently, two options currently exist for PDCCH design. Option 1 is that the PDCCH is transmitted on the same carrier as the carrier on which the corresponding PDSCH is transmitted, and option 2 shows that the PDCCH can be transmitted on a carrier different from the carrier on which at least one of the corresponding PDSCHs is transmitted.

In the first option, the PDCCH on a component carrier assigns PDSCH resources on the same component carrier and PUSCH resources on a single linked uplink component carrier. In this case, no carrier indicator field is present. That is, the Release-8 PDCCH structure may continue to be used with the same coding, same CCE-based resource mapping, and DCI formats.

Regarding the second option, the PDCCH on a component carrier can assign PDSCH or PUSCH resources in one of multiple component carriers using the carrier indicator field. In this case, Release-8 DCI formats are extended with a 1-3 bit carrier indicator field. The remainder of the Release-8 PDCCH structure may be reused with the same coding and same CCE-based resource mapping.

Figure 3:
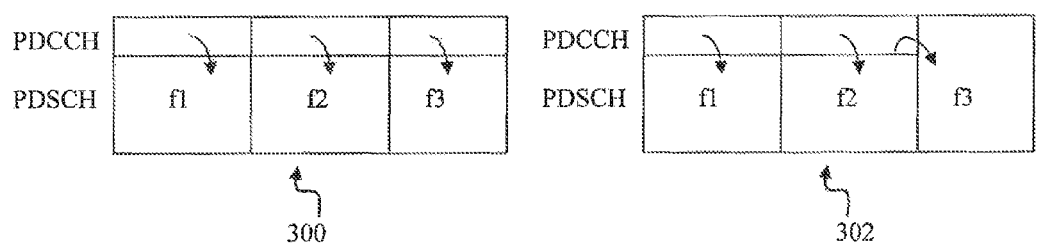
FIG. 3 is a diagram illustrating alternative implementations of carrier aggregation, in accordance with an embodiment of the disclosure.

FIG. 3 is a diagram illustrating alternative implementations of carrier aggregation, in accordance with an embodiment of the disclosure. FIG. 3 shows the above two alternatives. The first alternative, shown at arrow 300, shows the PDCCH is transmitted on the same carrier as the carrier on which the PDSCH is transmitted. The second alternative, shown at arrow 302, shows that the PDCCH can be transmitted on a carrier different from the carrier on which the PDSCH is transmitted. For this second alternative, a CIF may be used to indicate the carrier on which PDSCH or PUSCH is allocated. The CIF requires additional signaling bits that are added to a DCI, for either a downlink resource grant or uplink resource grant, to allow PDCCH signaling on a PDCCH monitoring carrier to refer to resources on a different carrier.

Table 1 through Table 4, below, contain the bit lengths of all of the DCIs for different bandwidths, and also for the cases of FDD versus TDD, and two transmission antennas at the eNB versus 4 transmission antennas. DCIs 0, 1A, and 3/3A may always have the same length. The lengths of DCIs 1B, 1D, 2, and 2A vary, in part, based on the number of transmission antennas in use at the eNB.

TABLE 1

DCI format sizes in LTE Release-8. This table relates to FDD with two transmission antennas at the eNB.

| DCI Format | 1.4 MHz | 3 MHz | 5 MHz | 10 MHz | 15 MHz | 20 MHz |
|---|---|---|---|---|---|---|
| 0/1A/3/3A | 21 | 22 | 25 | 27 | 27 | 28 |
| 1 | 19 | 23 | 27 | 31 | 33 | 39 |
| 1B | 22 | 25 | 27 | 28 | 29 | 30 |
| 1C | 8 | 10 | 12 | 13 | 14 | 15 |
| 1D | 22 | 25 | 27 | 28 | 29 | 30 |
| 2 | 31 | 34 | 39 | 43 | 45 | 51 |
| 2A | 28 | 31 | 36 | 41 | 42 | 48 |

TABLE 2

DCI format sizes in LTE Release-8. This table relates to FDD with four transmission antennas at the eNB.

| DCI Format | 1.4 MHz | 3 MHz | 5 MHz | 10 MHz | 15 MHz | 20 MHz |
|---|---|---|---|---|---|---|
| 0/1A/3/3A | 21 | 22 | 25 | 27 | 27 | 28 |
| 1 | 19 | 23 | 27 | 31 | 33 | 39 |
| 1B | 25 | 27 | 28 | 30 | 31 | 33 |
| 1C | 8 | 10 | 12 | 13 | 14 | 15 |
| 1D | 25 | 27 | 28 | 30 | 31 | 33 |
| 2 | 34 | 37 | 42 | 46 | 48 | 54 |
| 2A | 30 | 33 | 38 | 42 | 45 | 50 |

TABLE 3

DCI format sizes in LTE Release-8. This table relates to TDD with two transmission antennas at the eNB.

| DCI Format | 1.4 MHz | 3 MHz | 5 MHz | 10 MHz | 15 MHz | 20 MHz |
|---|---|---|---|---|---|---|
| 0/1A/3/3A | 23 | 25 | 27 | 29 | 30 | 31 |
| 1 | 22 | 26 | 30 | 34 | 36 | 42 |
| 1B | 25 | 27 | 29 | 31 | 33 | 33 |
| 1C | 8 | 10 | 12 | 13 | 14 | 15 |
| 1D | 25 | 27 | 29 | 31 | 33 | 33 |
| 2 | 34 | 37 | 42 | 46 | 48 | 54 |
| 2A | 31 | 34 | 39 | 43 | 45 | 51 |

TABLE 4

DCI format sizes in LTE Release-8. This table relates to TDD, four transmission antennas at the eNB.

| DCI Format | 1.4 MHz | 3 MHz | 5 MHz | 10 MHz | 15 MHz | 20 MHz |
|---|---|---|---|---|---|---|
| 0/1A/3/3A | 23 | 25 | 27 | 29 | 30 | 31 |
| 1 | 22 | 26 | 30 | 34 | 36 | 42 |
| 1B | 27 | 29 | 31 | 33 | 34 | 35 |
| 1C | 8 | 10 | 12 | 13 | 14 | 15 |
| 1D | 27 | 29 | 31 | 33 | 34 | 35 |
| 2 | 37 | 41 | 45 | 49 | 51 | 57 |
| 2A | 33 | 36 | 41 | 45 | 47 | 53 |

DCI Set Switching

An issue not fully addressed by the existing technical specifications is DCI set switching when carrier aggregation is in use. The embodiments described herein relate to DCI set switching when carrier aggregation is in use. The following paragraphs briefly summarize some of these embodiments, as well as issues relating to DCI set switching.

A DCI set refers either to the set of Non-CIF DCIs, such as Release-8 DCIs, or to a set of CIF-DCIs. Multiple CIF-DCI sets with different length CIF fields may exist. A CIF field may have a length from 1 to 3 bits, possibly more.

DCI set switching refers to a procedure of switching from using Non-CIF-DCIs to CIF-DCIs, or from using CIF-DCIs to Non-CIF-DCIs, or from CIF-DCIs with a certain length DCI field to CIF-DCIs with a different length DCI field. The embodiments described herein mainly describe switching from Non-CIF-DCIs to CIF-DCIs, but all of the identified problems and proposed solutions may be equally applicable for switching in the opposite direction. Thus, the embodiments are not limited to switching from Non-CIF-DCIs to CIF-DCIs, but include any kind of DCI set switching.

In an embodiment, the CIF may include additional signaling bits that are added to a DCI format to allow PDCCH signaling on a PDCCH monitoring carrier to refer to PDSCH or PUSCH resources on a different carrier. The CIF may be used for either a downlink resource allocation or an uplink resource grant.

Non-CIF-DCIs may refer to DCIs which do not include a CIF, such as the Release-8 DCIs. This embodiment may also include the situation where the length of the CIF was zero.

CIF-DCIs may include an additional CIF of length 1-3 bits with all relevant DCIs to indicate the carrier on which PDSCH or PUSCH is allocated. A DCI set may refer either to the set of Non-CIF-DCIs or to a set of CIF-DCIs. Multiple CIF-DCI sets may exist, with each CIF-DCI set having different length CIF fields.

DCI X may refer to a specific DCI format or length in a particular DCI set, such as (but not limited to) the set of Non-CIF-DCIs. DCI X+ may refer to the corresponding DCI format or length in a different DCI set, such as (but not limited to) the set of CIF-DCIs. DCI X+ may have a greater length than does DCI X, due to the presence of the additional CIF field.

One case where DCI X and DCI X+ might have the same length is if DCI X has been padded to avoid an ambiguous DCI length. Ambiguous lengths include 12, 14, 16, 20, 24, 26, 32, 40, 44, and 56, and possibly others. In an example, if DCI X includes one padding bit and DCI X+ includes a one-bit CIF, then DCI X and DCI X+ might have the same length. A further example of this situation would be DCI 1A for a bandwidth of 10 MHz. This DCI has a length of 27 bits, of which 1 bit is a padding bit in order to avoid the ambiguous length of 26 bits. However, the corresponding DCI 1A with a 1-bit CIF would also have a length of 27 bits, because the extra padding bit would not be required in this case.

Understanding of DCI set switching may be enhanced by an understanding of RRC signaling. In RRC signaling, an RRC command refers to an RRC message sent from the eNB to the UE to order a specific RRC procedure to be performed. Examples of such a procedure include multi-carrier activation, reconfiguration, or deactivation. RRC acknowledgement refers to an RRC message sent from the UE to the eNB to acknowledge that an ordered RRC procedure has been successfully, or possibly unsuccessfully, completed.

As mentioned above, some issues exist relating to the procedure of switching from using one DCI set, referred to as the old DCI set, to using another DCI set, referred to as the new DCI set. For example, switching may occur from a Non-CIF-DCI set to a CIF-DCI set, such as in multi-carrier activation or the configuration of a subset of active carriers as PDCCH monitoring carriers. In another example, switching may occur from a CIF-DCI set to a Non-CIF-DCI set, such as in multi-carrier deactivation or the configuration of all active carriers as PDCCH monitoring carriers. In yet another example, switching may occur from a CIF-DCI set with a CIF length of M to a different CIF-DCI set with a CIF length of N (M≠N), such as in multi-carrier reconfiguration, where the length of the CIF field is changed.

An embodiment for switching DCI sets may be described using the following steps. These steps also illustrate network entry for a UE capable of supporting multiple carriers. First, a UE capable of supporting multiple carriers may perform network entry as a Release-8 UE, even if the UE is a Release-10 UE. The eNB may use Non-CIF-DCIs to send PDCCH information to the UE. Second, the multi-carrier UE may signal its multi-carrier capabilities to the eNB via the UE capability exchange procedure. Third, the eNB may reconfigure the UE for multi-carrier operation, which includes the use of CIF-DCIs on the PDCCH as dedicated control signaling to that UE. Broadcast PDCCH signaling, such as system information (SI-RNTI) and paging (P-RNTI) might continue to use Non-CIF-DCIs.

At one or more points during the above procedure, both the eNB and UE might need to switch from using one DCI set to using a different DCI set. The exact time points for DCI set switching may not necessarily be the same for the eNB and UE. An issue relating to DCI set switching in this procedure is to ensure that the eNB and UE do not lose contact with each other during the DCI set switching procedure. Loss of contact between the eNB and UE is potentially possible because corresponding DCI formats in each of the two DCI sets may have different lengths. Hence, the eNB could be transmitting a DCI format with one length, such as DCI X from the Non-CIF-DCI set, while the UE is attempting to blind decode that DCI format but with a different length, such as DCI X+ from the CIF-DCI set. Various aspects of this issue are discussed below.

When a UE is instructed to perform an RRC procedure, including the switching of DCI sets, no fixed activation time might be associated with the particular RRC procedure in LTE. Certain RRC procedures do have processing delay requirements, in that the UE might be expected to complete a particular procedure within a certain period of time as measured from the time the UE successfully received the RRC command initiating that procedure. However, the exact time at which the UE applies a radio resource configuration might be unknown at the eNB. Hence, a window of uncertainty exists during which the eNB might be unsure as to the current configuration of the UE.

For these reasons, an eNB might not be completely sure that a UE has performed an instructed RRC procedure until the eNB receives back an RRC message from the UE acknowledging a successful completion of the procedure. The eNB may hypothesize that the UE has successfully received the RRC command initiating the procedure when an HARQ ACK for the physical layer transport block containing the RRC command is received from the UE. However, there is a small but non-zero probability that the UE may signal a HARQ NACK, but the eNB decodes this signal as an ACK. This type of error may be referred to as a NACK-to-ACK error.

In such a situation, the eNB may behave as if the UE has received the RRC command when in fact the UE has not. Because the eNB has incorrectly received a HARQ ACK for the transport block containing the RRC command, the eNB may not, and some cases will never, perform any further HARQ retransmissions of that transport block. At some time later, when the eNB expects to receive the RRC acknowledgement message from the UE but does not, the eNB may realize that the UE never in fact received the original RRC command. This time period during which the eNB is unaware of the error may be equal to at least the sum of the RRC procedure's processing delay, as described above, and the time used to perform an uplink transmission. This latter time period may be further lengthened if uplink HARQ retransmissions, or even RLC ARQ retransmissions at worst, are necessary or desirable.

NACK-to-ACK errors are expected to be relatively rare. However, in a full network deployment with many eNBs and an even larger number of UEs, even a small individual probability of this error occurring may result in a large total number of NACK-to-ACK errors occurring. An alternative method for obtaining a reliable acknowledgement for data transmission is through the use of an AM RLC ACK of the RLC SDU (PDCP PDU) containing the RRC command. However, this ACK may also be delayed since the receiving AM RLC entity may not issue an immediate STATUS report, which provides ARQ ACK/NACK information. Additionally, the MAC PDU containing such a STATUS report may also be subject to uplink HARQ retransmissions, and thereby incur further delay.

As described in the preceding paragraph, when an eNB instructs a UE to switch DCI sets, the eNB may not be completely sure that the UE has actually received and/or acted upon the RRC command to perform the switch until the eNB receives the corresponding RRC acknowledgement message back from the UE. The UE transmits this RRC acknowledgement on the uplink, which may necessitate receiving an uplink grant, that is DCI 0, on the PDCCH from the eNB. However, if the UE is to switch DCI sets, such as from using DCI 0 to DCI 0+, and the eNB cannot be sure of this action having been performed until the eNB receives the RRC acknowledgement message, then a question arises as to whether the eNB should use a DCI 0 or DCI 0+ on the PDCCH to send an uplink grant to the UE so that the UE can transmit this RRC acknowledgement message.

When switching from one DCI set to another DCI set, there is also a potential issue of DCI length ambiguity in certain cases. For example, the UE may be in a transmission mode where the UE is searching for downlink resource assignment DCIs "X" and "Y" on the PDCCH. DCI X could be DCI 1A and DCI Y could be the specific DCI associated with the currently configured transmission mode. If the UE is switched from the Non-CIF-DCI set to the CIF-DCI set, then possibly DCI X and DCI Y+, or DCI Y and DCI X+, may have the same lengths. Because the UE may be unaware of exactly when the eNB switches from transmitting the Non-CIF-DCI set to transmitting the CIF-DCI set on the PDCCH, if the UE successfully blind decodes a PDCCH candidate, the UE may not be able to determine unambiguously whether that PDCCH candidate corresponds to DCI X or DCI Y+, or alternatively, to DCI Y or DCI X+. Specific examples of such scenarios can be derived by referring to the DCI format lengths listed in Table 1 to Table 4, shown above.

In an illustrative example, suppose a UE is configured in transmission mode 5, which uses DCI 1 D, or transmission mode 6, which uses DCI 1B. DCIs 1B and 1D are of the same length for a given bandwidth and number of Tx antennas at the eNB, so this example applies equally well to both DCI formats. With two Tx antennas at the eNB, DCIs 1B and 1D have a length of 28, 29, or 30 bits, respectively, for bandwidths of 10 MHz, 15 MHz, and 20 MHz. DCI format 1A, which must also be searched for, has a length of 25, 27, or 28 bits, for the same three bandwidths. Suppose that a 1-bit (10 MHz) or 2-bit (15 and 20 MHz) CIF field was then added to these DCI formats. Then, DCI 1A+ would have a length of 28, 29, or 30 bits, for the three given bandwidths. In this case, these lengths are identical to the DCI 1B/1D lengths, so the UE would be unable to distinguish between DCI 1A+ and DCI 1B/1D simply by blind decoding.

Similarly, when four Tx antennas are present at the eNB and a 10 MHz carrier is used, DCIs 1B/1D have a length of 30 bits, while DCI 1A has a length of 27 bits. If a 3-bit CIF field is used, then DCI 1A+ would have the same length (27+3=30) as DCIs 1B/1D.

This DCI length ambiguity issue may also exist for the situations where carriers of different bandwidths share the same PDCCH and/or where different carriers may be configured in different transmission modes. This issue may be exacerbated by carriers that are at widely-separated frequencies since such carriers may exhibit different wireless propagation characteristics and may therefore be more likely to be configured in different transmission modes than are carriers that are closely-spaced in frequency.

The issue of switching DCI sets while ensuring that PDCCH communications between the eNB and UE are not lost has some similarities to the existing procedure of reconfiguring a UE to use a different transmission mode. Generally, a UE may be configured to operate in one of several possible transmission modes. For each transmission mode, the UE may be expected to search for DCI 0/1A, which have the same length, and one of DCIs 1, 1B, 1D, 2, and 2A, depending upon the current transmission mode. When a transmission mode change is "instructed," as an RRC procedure, there is a window of uncertainty between the eNB transmitting the RRC command and the eNB receiving the RRC acknowledgement. This uncertainty is described further above. During this window of uncertainty, the eNB may not be certain which of the two, either the old or the new, transmission modes the UE is currently operating in.

A solution to this issue may be to attempt to ensure that the UE may always search for DCI 1A in every transmission mode. An eNB can then use DCI 1A to send downlink resource assignments to the UE until the RRC acknowledgement message is received back from the UE. The eNB can then switch, if desired, to using the particular DCI associated with the current transmission mode, that is DCI 1, 1B, 1D, 2 or 2A. Similarly, the UE may always searches for a DCI 0 on the PDCCH regardless of the currently configured transmission mode. In this manner, the eNB may be able to send, and in some embodiments is always able to send, uplink grants to the UE.

However, a switch from the Non-CIF-DCI set to a CIF-DCI set, or vice versa, or between CIF-DCI sets with different length CIF fields, may result in different length DCIs, such as 1A and 1A+, being used on the PDCCH. There is no DCI similar to DCI 1A that can be received in all possible carrier aggregation modes, for example with CIF field lengths of 0, 1, 2, or 3 bits.

A switch from the Non-CIF-DCI set to a CIF-DCI set, or vice versa, or between CIF-DCI sets with different length CIF fields, may likely result in a change in length for DCI 0 as a CIF field is either added or deleted. For this reason, there exists a definite risk that the eNB may be unable to provide decodable uplink grants to the UE. Switching transmission modes as described above may not result in a length change of DCI 0, and in some cases will never result in such a length change. Hence, the eNB may always be able to continue providing uplink grants to the UE even if the eNB is unsure as to which transmission mode the UE is currently in, and in some cases may always be able to continue to provide such uplink grants.

As mentioned above, a DCI set refers either to the set of Non-CIF-DCIs, such as Release-8 DCIs, or to a set of CIF-DCIs. Multiple CIF-DCI sets with different length CIF fields may exist. A CIF field may have a length from 1 to 3 bits, possibly more.

When constructing a CIF-DCI from the corresponding Non-CIF-DCI, such as DCI 1A+ from DCI 1A, it might be necessary to include a CIF field somewhere within the information bit payload of the DCI. This CIF field may be added at the beginning of the information bits, following all of the existing information bits, or possibly even somewhere in the middle of the existing fields.

When the information bit payload of a Release-8 DCI format has an ambiguous bit length, then an additional padding bit with a value of 0 may be appended, and in some cases is always appended, to the information bit payload. The ambiguous bit length sizes include 12, 14, 16, 20, 24, 26, 32, 40, 44, and 56. In addition, if the payload value plus any padding bits of a Release-8 DCI 1 is equal to that of DCI 1A for the same bandwidth, then an additional zero padding bit may be added, and in some cases is always added, to DCI 1 so that DCI 1 and 1A do not have the same length.

The embodiments described herein each address one or more of the issues described above. The following embodiments may be considered when defining the exact formats of new CIF-DCIs, especially when padding bits resulting from application of the rules described above are included.

FIG. 4 is a diagram illustrating adding a CIF field to a Release-8 DCI while retaining any existing padding bits. DCI formats 400 all refer to the same DCI format being modified over time. DCI format 402 shows the original DCI format with one or more padding bits 403. These padding bits 403 need not be present. DCI format 404 shows the same DCI format as DCI format 402, with the addition of a CIF 405.

Existing padding bits may be retained, and the CIF field is added. The CIF field need not necessarily be added at the end of the payload. DCI format 406 shows the same DCI format as DCI format 404, with the addition of one or more further padding bits 407. These further padding bits 407 might be added in order to avoid ambiguous total payload lengths. For certain bandwidths, CIF field lengths, DCI formats, and the further padding bits 407 might not be necessary or desirable.

In one embodiment, adding a CIF field to a Release-8 DCI may increase the length of the resulting DCI. The existing Release-8 DCI payload of length M is originally retained, plus any padding bits that are to be added. A CIF field of length N may be included in the payload. If the resulting length (M+N) corresponds to one of the ambiguous payload sizes listed above, then an additional padding bit may be included. In addition, if the resulting length of DCI 1+ equals that of DCI 1A+, then additional padding bits may be included in DCI 1+ until the total length is not equal to that of DCI 1A+ and its length does not belong to the set of ambiguous sizes, such as those listed above. An example of this procedure using DCI 1A is illustrated in FIG. 4.

FIG. 5 is a diagram illustrating adding a CIF field to a Release-8 DCI while removing any existing padding bits, in accordance with an embodiment of the disclosure. DCI formats 500 all refer to the same DCI format being modified over time. DCI format 502 shows the original DCI format with one or more padding bits 503. These padding bits 503 need not be present. DCI format 504 shows the same DCI format as DCI format 502, after removing the padding bits 503. DCI format 506 shows the same DCI format as DCI format 504, but with the addition of a CIF 507. DCI format 508 shows the same DCI format as DCI format 506, but with the addition of one or more further padding bits 509.

Note that a Release-8 DCI format 1 Å may or may not include one or more padding bits 503. However, if they are present, then the padding bits 503 may be removed, as in DCI format 504. A CIF field is then added (507), but might not necessarily be at the end of the payload as shown. For DCI format 508, the extra padding bit or bits (509) may be added in order to avoid ambiguous total payload lengths. For certain bandwidths, CIF field lengths, and DCI formats, this step might not be necessary or desired.

Thus, in this embodiment, any padding bits that were added to the existing Release-8 DCI payload of length M are removed. There may be "P" such padding bits, where P could be zero. A CIF field of length N may be included in the payload. If the resulting length (M−P+N) corresponds to one of the ambiguous payload sizes, such as those listed above, then an additional padding bit may be included. In addition, if the resulting length of DCI 1+ equals that of DCI 1A+, then additional padding bits may be included in DCI 1+ until its length is not equal to that of DCI 1A+ and its length does not belong to the set of ambiguous sizes listed above. An example of this procedure using DCI 1A is illustrated in FIG. 5.

DCI Set Switching

As introduced above, the concept of using different DCI sets for different multi-carrier configurations might be required or desirable if a CIF field is to be added to existing DCI formats. For this reason, defining a procedure for switching between different DCI sets may be desirable or necessary.

Again, DCI set switching refers to the procedure of switching from using one DCI set, referred to as the old DCI set, to using another DCI set, referred to as the new DCI set. This procedure may include a switch involving any of the following.

DCI set switching may include switching from Non-CIF-DCIs to CIF-DCIs. An example of this type of switch may occur during multi-carrier activation or the configuration of a subset of active carriers as PDCCH monitoring carriers.

DCI set switching may include switching from CIF-DCIs to Non-CIF-DCIs. An example of this type of switch may occur during multi-carrier deactivation or the configuration of all active carriers as PDCCH monitoring carriers.

DCI set switching may include switching from CIF-DCIs with a certain length DCI field to CIF-DCIs with a different length DCI field. An example of this type of switch may occur during multi-carrier reconfiguration, where the length of the CIF field is changed.

One specific embodiment of the expected overall format of this procedure to switch DCI sets can be described via the following steps. These steps also illustrate network entry for a UE capable of supporting multiple carriers.

First, a UE capable of supporting multiple carriers (e.g. Rel-10) performs network entry as a Release-8 UE. The eNB uses Non-CIF-DCIs to send PDCCH information to the UE. Second, a multi-carrier UE may signal its multi-carrier capabilities to the eNB via the UE capability exchange procedure. Third, the eNB may reconfigure the UE for multi-carrier operation. Reconfiguring may includes the use of CIF-DCIs on the PDCCH as dedicated control signaling to that UE. Broadcast PDCCH signaling such as system information, SI-RNTI, and paging, P-RNTI, might continue to use Non-CIF-DCIs.

Specify an Activation Time

In another embodiment for performing DCI set switching, the RRC command that orders a switch in DCI sets could also include an activation time. The activation time could be in the form of an SFN and subframe offset within that radio frame. The specified activation time may be sufficiently far in the future that there would be enough time for the UE to receive the RRC command and then transmit an RRC acknowledgement back to the eNB. The eNB would thus have a clear acknowledgement that the UE would also switch DCI sets before the switch is scheduled to occur. The eNB and UE would then perform a coordinated switch in DCI sets at the same time. This action would eliminate the uncertainty window where the UE and eNB may not be sure which DCI set the other entity is using.

If the eNB did not receive an RRC acknowledgement back from the UE or had not received an ARQ ACK from the AM RLC entity associated with the control-plane SRB1 that carries RRC traffic, the eNB would realize that the UE had not received the original RRC command. The UE might not have received the original RRC command due to, perhaps, a NACK-to-ACK error. In such a situation, the eNB would not switch DCI sets, but would instead resend the RRC command with a new activation time.

One potential issue to this approach is that it might not enable the UE to perform the DCI set switch in multi-carrier configuration as soon as possible. There may be various delays in transmitting the RRC command and/or RRC acknowledgement. These delays might result, for example, due to downlink HARQ and/or uplink HARQ retransmissions. Hence, the activation time may be set sufficiently far in the future to account for additional delay potentially introduced by possible downlink and/or uplink HARQ retransmissions. Setting the time in this manner reduces the flexibility and dynamic responsiveness of the system.

eNB does not Assign Resources to the UE During Uncertainty Window

In another embodiment for performing DCI set switching, the eNB might not assign resources to the UE, via the PDCCH, during the uncertainty window described above. Because there is an uncertainty window during which the eNB may be unsure as to which DCI set the UE is currently using, the eNB could simply avoid sending any downlink transmissions or uplink grants to the UE during this uncertainty period. The only exception might be for downlink HARQ retransmissions of the transport block containing the RRC command, if such retransmissions are required. By temporarily "suspending" contact, there would be no danger in the eNB sending PDCCH communications that the UE would be unable to blind decode.

This approach, however, has a few issues. The length of the uncertainty window could be extended if downlink and/or uplink HARQ retransmissions are required or desired. During this time, all downlink and uplink traffic might be blocked, which would have a temporary impact on throughput to/from the UE. Further, if there are important messages to be delivered to the UE immediately, such as mobility-related signaling, this solution may incur additional undesirable delay. Another key issue is that the eNB might still have a problem in sending an uplink grant to the UE so that the UE can transmit the RRC acknowledgement. If, in fact, the UE did not perform the DCI set switch, such as in the case of a NACK-to-ACK error, then the eNB might send the UE a DCI 0+, while the UE would be searching for a DCI 0 (with a different length) on the PDCCH. This situation assumes a switch from the Non-CIF-DCI set to a CIF-DCI set. This issue could, however, be addressed via the solution described immediately below.

eNB Transmits DCIs from Both DCI Sets During Uncertainty Window

In another embodiment for performing DCI set switching, during the uncertainty window, the eNB could transmit DCIs from both DCI sets to the UE. These DCI pairs may refer to the same downlink resources or uplink grant. For example, if the eNB was performing a downlink transmission, it might include both a DCI 1A and DCI 1A+ on the PDCCH for a given subframe. Both DCI formats may both point to the same downlink resources on the PDSCH. Similarly, for an uplink grant, the eNB might include both a DCI 0 and DCI 0+, with both DCI formats referring to the same uplink resources on the PUSCH. In this case, it does not matter which DCI set the UE was currently using, because DCIs from both sets would be present on the PDCCH.

A benefit of using this approach is that the number of blind decodings that the UE must perform on the PDCCH is not increased. Furthermore, traffic to and/or from the UE is not blocked during the uncertainty window, as might be the case for the solution described above.

However, transmitting from both DCI sets could increase the blocking probability on the PDCCH, because the eNB might now have to find additional space on the PDCCH for both DCIs. This increased blocking probability could result in inefficient use of the PDSCH and/or PUSCH resources within the cell due to PDCCH blocking. Additionally, a possibility of confusion exists between ambiguous DCI lengths as described above. Potential solutions to this latter problem are described below with respect to the embodiments of specifying which DCI is to be used when ambiguous DCI lengths are present, and switching to non-ambiguous transmission mode before switching DCI sets.

If the technique of avoiding assignation of resources to the UE during the DCI set switching uncertainty window were used, as described above, the eNB could then use the technique of sending both DCI sets to send both a DCI 0 and DCI 0+ to the UE when the eNB wishes to provide an uplink grant for the UE to transmit the RRC acknowledgement. This technique may ensure that the UE was able to receive the uplink grant, regardless of which DCI set the UE was currently using. By only transmitting paired DCIs from both DCI sets in this limited fashion, that is only to provide the uplink grant for the RRC acknowledgement, the potential impact on PDCCH blocking may be minimized.

In view of this fact, a hybrid solution may be used by combining the techniques of avoiding assigning of resources during the uncertainty window and sending pairs of DCI sets. That is, during the transient time, the eNB may try to temporarily block as many uplink and downlink transmissions as possible. In the case any transmissions must be made, the eNB may transmit DCIs from both DCI sets to the UE.

In another embodiment, the technique of specifying an activation time can be combined with this technique of transmitting both DCI sets during the uncertainty window. In this case, the eNB might only send both DCI sets to the UE after the activation time if the eNB does not receive the RRC acknowledgement message, or AM RLC feedback, from the UE prior to the activation time. In this way, the activation time may be set to a shorter duration. If the UE has not received and processed the RRC command prior to the activation time, the UE might still be able to decode the old DCI set.

New DCI Format

In another embodiment for performing DCI set switching, a new DCI format could be defined that the UE would search for on the PDCCH, regardless of the current multi-carrier configuration of the UE. This technique could be used in order to reduce the likelihood that the eNB and UE would lose contact with each other, regardless of which DCI set each entity is using. This technique would be a similar idea to a DCI 1A that the UE searches for in all transmission modes, as described above with regard to DCI sets and DCI set switching.

This embodiment might, however, increase the number of blind decodes that a multi-carrier capable UE would have to perform. Increasing the number of blind decodes might undesirably increase the processing and power consumption at the UE. The design of DCI 1A was optimized in that DCI 1A is the same length as DCI 0 and DCI 3/3A, which the UE must also search for, and hence the UE can search for all of these DCI formats via a single blind decode on a particular PDCCH candidate. However, searching for all DCI formats via single blind decode might not be possible if yet another DCI format is introduced.

In an embodiment, the new DCI format might have a fixed length regardless of the number of activated carriers. Thus, the new DCI format might not include a CIF field or might include a CIF field with a fixed length equal to the maximum possible CIF size (e.g. 3 bits). Additionally, the lengths of the existing DCI formats might vary based on the length of any CIF field that was included.

In addition to a new DCI format, a new DCI might be defined in such a manner that the DCI length was different from all other possible DCI formats, including DCIs both with and without a CIF field. This new DCI would allow the UE to unambiguously identify that DCI via blind decoding. However, finding a new length that does not "collide" with any of the existing possible DCI lengths might be difficult.

In a related embodiment, the UE might be required to always search for DCI 1A, with no CIF field, and DCI 0, which would be the same length, regardless of whether or not carrier-aggregation was enabled. If found, the DCI 1A or DCI 0 would be assumed to refer to the anchor carrier or to the carrier which contains the PDCCH. Hence, a CIF field might not be required. However, this embodiment might result in the UE having to perform a greater number of blind decodes, because this technique might add one more additional DCI lengths that the UE would have to search for.

Dual DCI Set Blind Decoding at the UE/Two-Way Handshake

Figure 6:
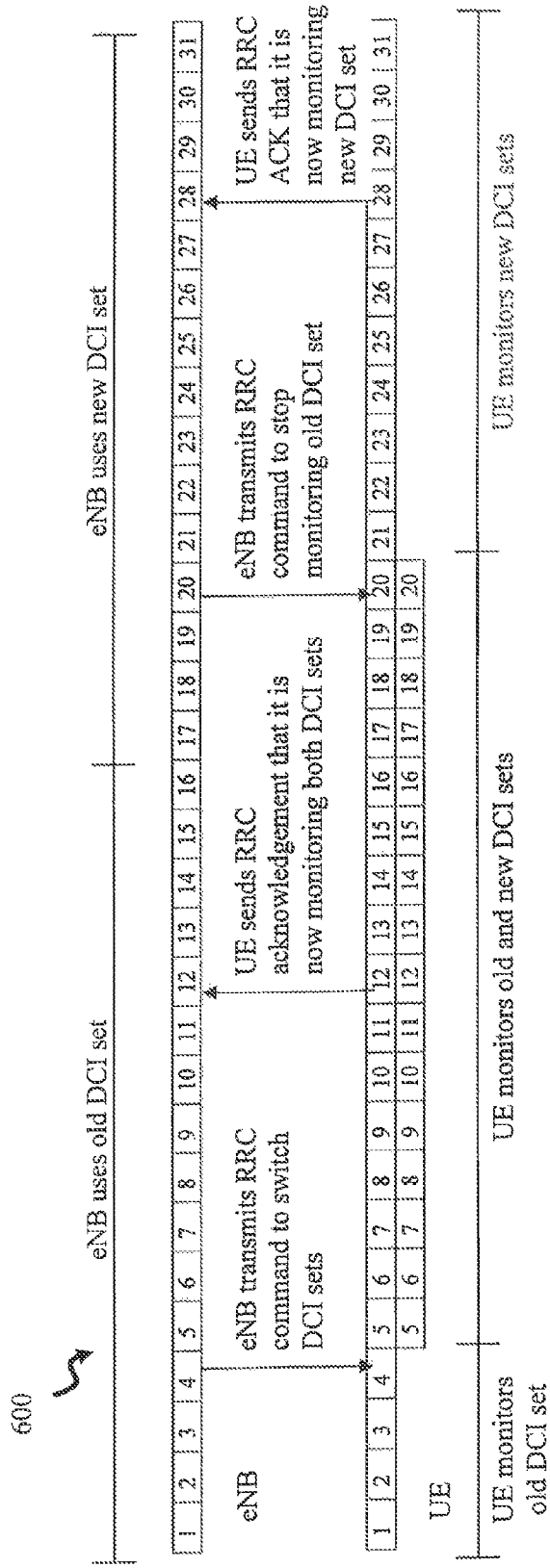
FIG. 6 is a diagram illustrating a two-way handshake procedure for performing DCI set switching, in accordance with an embodiment of the disclosure.

FIG. 6 is a diagram illustrating a two-way handshake procedure for switching DCI, in accordance with an embodiment of the disclosure. In this embodiment, as shown in FIG. 6, the old DCI set refers to the DCI set that is being used prior to a DCI set switch, while the new DCI set refers to the DCI set that is to be used following the DCI set switch. DCI sets 600 in relation to both the eNB and the UE are presented in FIG. 6.

After an eNB sends an RRC command ordering a DCI set switch to the UE, the eNB may continue to use the old DCI set. When a UE receives an RRC command ordering a DCI set switch, the UE may temporarily begin monitoring both DCI sets on the PDCCH. When the eNB wishes the UE to transmit the RRC acknowledgement message, the eNB may send an uplink grant, DCI 0, to the UE. After the eNB has successfully received the RRC acknowledgement, the eNB knows that the UE is monitoring both DCI sets, and can then switch to the new DCI set. The UE can stop monitoring the old DCI set when one of the following conditions is satisfied.

One condition may be that the eNB sends a further RRC command instructing the UE to stop monitoring the old DCI set. Another condition may be that the UE has received a specified number of DCIs that unambiguously belong to the new DCI set. This number could either be specified as a fixed quantity in the standard or be configurable. The number may be configurable via RRC signaling. The number could even be included as a parameter in the RRC command that originally ordered the DCI set switch. It may be desirable to use a value larger than 1 in order to guard against false positive detections of DCIs on the PDCCH accidentally triggering this condition prematurely.

The approach described with respect to FIG. 6 may be considered a two-way handshake procedure, with the second handshake being either explicit (the first of the above two conditions) or implicit (the second of the above two conditions). The first handshake may occur by the UE signaling that it is now monitoring both DCI sets so that the eNB can now switch to using the new DCI set. The second handshake may occur when the eNB signals, either explicitly or implicitly, that it is no longer transmitting the old DCI set so that the UE can stop monitoring that DCI set.

This embodiment has a number of benefits. The two-way handshake procedure likely does not block downlink/uplink traffic to/from the UE, as might the embodiment described with respect to the eNB avoiding assigning resources during the uncertainty window. The two-way handshake procedure also does not increase the probability of blocking on the PDCCH, as might the embodiment described with respect to the eNB transmitting DCIs from both DCI sets during the uncertainty window. The two-way handshake procedure also may help ensure that the eNB and UE do not accidentally lose contact with each other due to a NACK-to-ACK error on the physical layer transport block that contains the RRC command ordering the DCI set switch.

Nevertheless, some additional blind decoding, and hence additional processing, might be used by the UE during the handshaking process involved with switching DCI sets. However, this additional processing would be only on a temporary basis. Hence, the additional processing may not result in significant incremental power consumption, especially if multi-carrier mode reconfigurations do not occur frequently.

When the UE is monitoring two DCI sets, there is a possibility that certain DCI formats in both of the DCI sets may have the same length. In this case, the UE might not know which DCI was intended in the event of a successful blind decoding on the PDCCH. For example, DCI X and DCI Y+ might have the same length, so the UE would not be able to unambiguously differentiate between these two DCI formats during the time period where the UE is monitoring both DCI sets. This situation may benefit from the use of one of the solutions described with respect to the embodiments of specifying which DCI is to be used when ambiguous DCI lengths are present or switch to non-ambiguous transmission mode before switching DCI sets, as described below.

Specifying which DCI is to be Used when Ambiguous DCI Lengths are Present

In another embodiment useful for performing DCI set switching, a determination or selection may be made regarding which DCI is to be used when ambiguous DCI lengths are present. When there exists a possibility of ambiguous DCI lengths during a DCI set switch, such as when DCI X and DCI Y+ have the same lengths as described above, a determination or selection may be made regarding which DCI format is to be avoided or assumed not to be present. The following paragraph provides an illustrative example of this embodiment.

Suppose there are two Tx antennas at the eNB, the multiple carriers all have 20 MHz bandwidth, and the UE is currently configured for transmission mode 5. If the UE is currently using the Non-CIF-DCI set, then the UE might be searching for DCI 1A (28 bits) and DCI 1D (30 bits) on the PDCCH. If the UE is reconfigured for multi-carrier operation with a 2-bit CIF field, then DCI 1A+ would have a length of 30 bits and DCI 1 D+ would have a length of 33 bits. An additional padding bit might be added to DCI 1D+ because 32 bits might not be an allowable length. There would thus be a potential blind decoding ambiguity between DCI 1D and DCI 1A+, because both would have a length of 30 bits.

In such a situation, the eNB might be required not to use DCI 1A+ until the eNB has received the RRC acknowledgement message back from the UE. After the eNB has received this RRC acknowledgement, the eNB knows that the UE is now monitoring only the CIF-DCI set. Consequently, the eNB may now use DCI 1A+ because the eNB knows that the UE is no longer searching for DCI 1D on the PDCCH. In the opposite direction, such as when switching from the CIF-DCI set to the Non-CIF-DCI set, the eNB may avoid using DCI 1D until the eNB received the RRC acknowledgement message from the UE, since there is the potential for confusion with DCI 1A+.

Thus, a specification may be made that the unused DCI format is the one belonging to the DCI set that the UE is supposed to switch to (i.e. the new DCI set), because there may be the chance that the UE does not know that it is supposed to switch DCI sets for some reason, such as the occurrence of a NACK-to-ACK error. This embodiment may ensure that the eNB does not send a DCI 1A+ that the UE might incorrectly interpret as a DCI 1D when the UE is still using the Non-CIF-DCI set, for example.

A related alternative embodiment might be for the eNB to avoid using all DCIs that may have ambiguous lengths until the RRC acknowledgement is received from the UE. This technique may not be possible, however. For example, it may be difficult for the eNB to avoid using DCIs of the same length as DCI 1A or 1A+, because DCI 0 & 0+ and DCIs 3/3A & 3+/3 A+ might also be of the same respective lengths.

Yet another alternative might be to specify additional padding bits in cases where ambiguous DCI format lengths might exist. This technique may eliminate all or most possible occurrences of ambiguous DCI format lengths. This technique may be complicated, however, due to the number of DCI lengths that already exist and the possible different lengths of the CIF field, such as 1, 2, or 3 bits.

Switch to Non-Ambiguous Transmission Mode Before Switching DCI Sets

In another embodiment useful for performing DCI set switching, a switch to a non-ambiguous transmission mode may be made before switching DCI sets. The possibility of having ambiguous DCI lengths during a DCI set switch, such as DCI X and DCI Y+ having the same length, may only occur for certain transmission modes. The examples provided above with regard to DCI sets and DCI set switching might only apply to transmission modes 5 and 6, for instance. If the UE is in such a potentially ambiguous transmission mode, the eNB might first reconfigure the UE to an intermediate "safe" unambiguous transmission mode. Thereafter, the eNB might instruct the UE to switch DCI sets, and then finally reconfigure the UE back to the desired transmission mode. Such a non-ambiguous safe transmission mode might be transmission mode 1 (single transmit antenna at the eNB) or transmission mode 2 (transmit diversity from the eNB) depending upon the number of transmit antennas at the eNB.

For example, suppose the UE was in single carrier mode and in transmission mode 5. In order to switch the UE to multi-carrier mode, the following steps could be performed.

First, the eNB may send an RRC command to the UE instructing the UE to switch to transmission mode 2. Second, the UE may send an RRC acknowledgement to the eNB stating that the UE had switched transmission modes. Third, the eNB may send an RRC command to the UE instructing the UE to switch to multi-carrier mode, with all carriers operating in transmission mode 2.

Fourth, the UE may then send an RRC acknowledgement to the eNB stating that the UE had activated multiple carriers. Fifth, the eNB may send an RRC command to the UE instructing the UE to switch back to transmission mode 5 on either all or a subset of the multiple carriers. Finally, the UE may send an RRC acknowledgement to the eNB stating that the UE had switched transmission modes.

This embodiment might involve signaling and performing three separate consecutive RRC procedures, rather than just one DCI set switch. Additional delay might result with respect to performing the overall multi-carrier reconfiguration. Furthermore, additional signaling overhead might be incurred with respect to sending RRC commands and RRC acknowledgements for each of the three RRC procedures.

Figure 7:
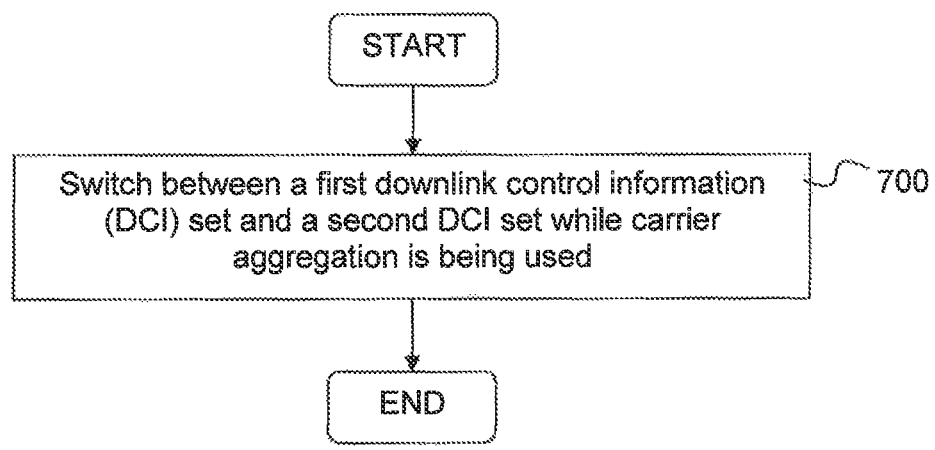
FIG. 7 is a flowchart illustrating a method for performing DCI set switching, in accordance with an embodiment of the disclosure.

FIG. 7 is a flowchart illustrating a method for performing DCI set switching, in accordance with an embodiment of the disclosure. The method shown in FIG. 7 may be implemented in either a UE or an access node, such as those shown in FIGS. 1 through 3, while carrier aggregation is being used. The method shown in FIG. 7 may be implemented using a processor and/or other components, such as those shown in FIG. 8. The method shown in FIG. 7 may be implemented using procedures such as those described with respect to FIGS. 4 through 6.

The process begins as the processor causes either a UE or an access node to cause a switch between a first downlink control information (DCI) set and a second DCI set while carrier aggregation is being used (block 700). The process terminates thereafter.

Figure 8:
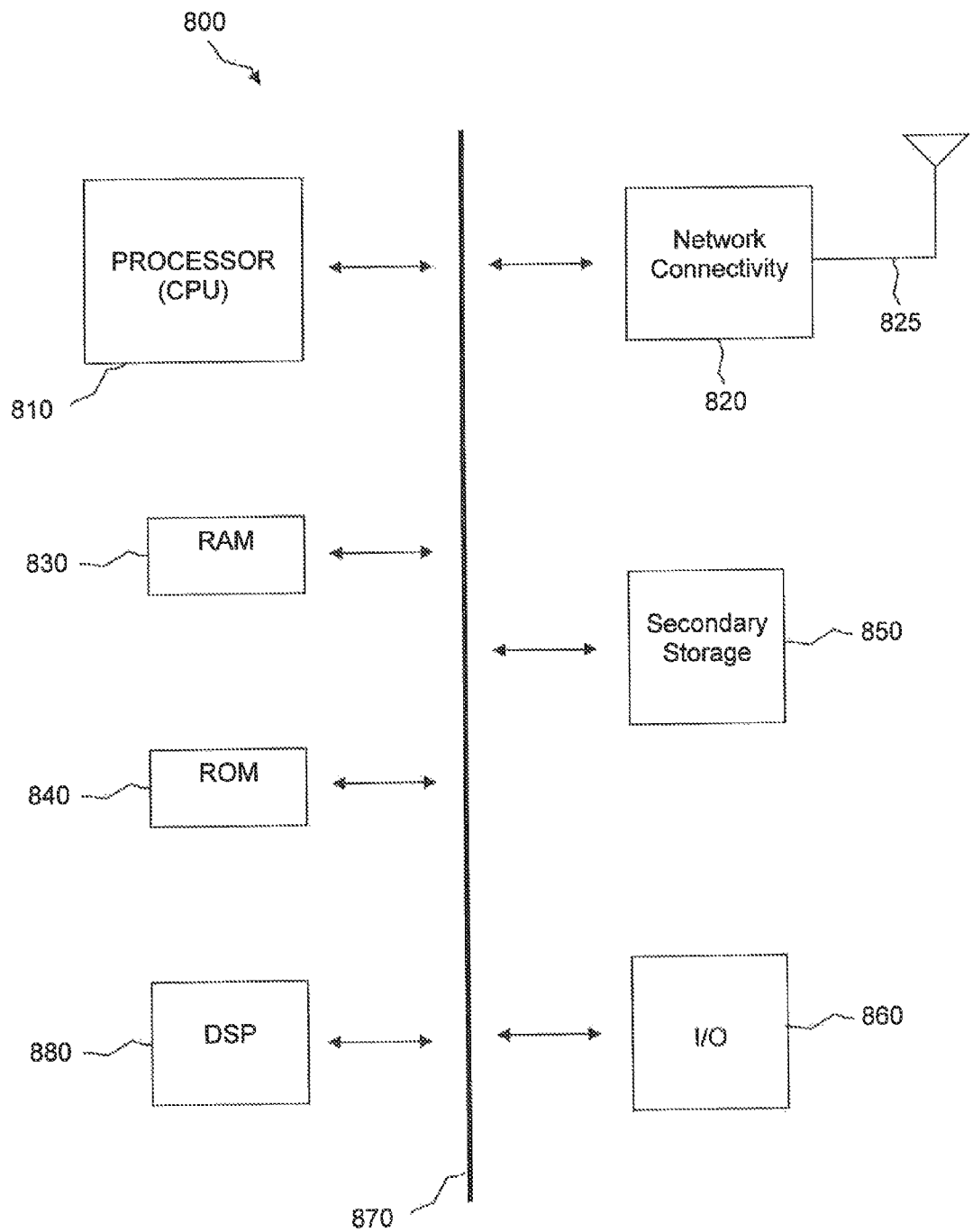
FIG. 8 illustrates a processor and related components suitable for implementing the several embodiments of the present disclosure.

The UE and other components described above might include processing and other components capable of executing instructions related to the actions described above. FIG. 8 illustrates an example of a system 800 that includes a processing component, such as processor 810, suitable for implementing one or more embodiments disclosed herein. In addition to the processor 810 (which may be referred to as a central processor unit or CPU), the system 800 might include network connectivity devices 820, random access memory (RAM) 830, read only memory (ROM) 840, secondary storage 850, and input/output (I/O) devices 860. These components might communicate with one another via a bus 870. In some cases, some of these components may not be present or may be combined in various combinations with one another or with other components not shown. These components might be located in a single physical entity or in more than one physical entity. Any actions described herein as being taken by the processor 810 might be taken by the processor 810 alone or by the processor 810 in conjunction with one or more components shown or not shown in the drawing, such as a digital signal processor (DSP) 880. Although the DSP 880 is shown as a separate component, the DSP 880 might be incorporated into the processor 810.

The processor 810 executes instructions, codes, computer programs, or scripts that it might access from the network connectivity devices 820, RAM 830, ROM 840, or secondary storage 850 (which might include various disk-based systems such as hard disk, floppy disk, or optical disk). While only one CPU 810 is shown, multiple processors may be present. Thus, while instructions may be discussed as being executed by a processor, the instructions may be executed simultaneously, serially, or otherwise by one or multiple processors. The processor 810 may be implemented as one or more CPU chips.

The network connectivity devices 820 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 820 may enable the processor 810 to communicate with the Internet or one or more telecommunications networks or other networks from which the processor 810 might receive information or to which the processor 810 might output information. The network connectivity devices 820 might also include one or more transceiver components 825 capable of transmitting and/or receiving data wirelessly.

The RAM 830 might be used to store volatile data and perhaps to store instructions that are executed by the processor 810. The ROM 840 is a non-volatile memory device that typically has a smaller memory capacity than the memory capacity of the secondary storage 850. ROM 840 might be used to store instructions and perhaps data that are read during execution of the instructions. Access to both RAM 830 and ROM 840 is typically faster than to secondary storage 850. The secondary storage 850 is typically comprised of one or more disk drives or tape drives and might be used for non-volatile storage of data or as an over-flow data storage device if RAM 830 is not large enough to hold all working data. Secondary storage 850 may be used to store programs that are loaded into RAM 830 when such programs are selected for execution.

The I/O devices 860 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver components 825 might be considered to be a component of the I/O devices 860 instead of or in addition to being a component of the network connectivity devices 820.

The following documents are hereby incorporated by reference in their entireties:

R1-093699, "Way Forward on PDCCH for Bandwidth Extension in LTE-A", Alcatel-Lucent et al.

R1-093465, "Component carrier indication scheme for carrier aggregation", Panasonic.

3GPP, TS 36.212 v8.7.0 (May 2008) "E-UTRA; Multiplexing and channel coding."

3GPP, TS 36.814.

The embodiments provide for method and devices for switching between a first downlink control information (DCI) set and a second DCI set while carrier aggregation is being used. While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method performed by a user equipment (UE), the method comprising:
   reconfiguring the UE, when carriers are aggregated for use by the UE, from a first downlink control information (DCI) set to a second DCI set; and
   receiving, at the UE from an access device, a physical downlink control channel (PDCCH) with DCI formats containing a carrier indicator field (CIF),
   wherein the first DCI set comprises a set of DCI formats having a first CIF size, and wherein the second DCI set comprises a set of DCI formats having a second, different CIF size.

2. The method of claim 1, wherein reconfiguring comprises changing from the first CIF size to the second CIF size, and wherein the first CIF size or the second CIF size may be equal to zero.

3. The method of claim 1, wherein at least one common DCI format size is included in both the first DCI set and the second DCI set.

4. The method of claim 1, wherein the CIF comprises signaling bits added to at least one of the DCI formats.

5. The method of claim 1, wherein the CIF enables signaling on the PDCCH of one carrier being aggregated to refer to radio resources of another carrier being aggregated.

6. The method of claim 5, wherein the radio resources referred to by the signaling on the PDCCH comprise at least one of physical downlink shared channel (PDSCH) resources and physical uplink shared channel (PUSCH) resources of the another carrier.

7. The method of claim 1, further comprising:
   when a size of a DCI format in the first DCI set equals a size of a different DCI format in the second DCI set, avoiding monitoring the DCI format in the second DCI set after the reconfiguring until a radio resource control (RRC) message is received at the UE.

8. The method of claim 1, further comprising:
   when a size of a DCI format in the first DCI set equals a size of a different DCI format in the second DCI set, including additional padding bits for the DCI format in the second DCI set.

9. A user equipment (UE) comprising:
   a processor configured to:
   reconfigure the UE, when carriers are aggregated for use by the UE, from a first downlink control information (DCI) set to a second DCI set; and
   receive, at the UE from an access device, a physical downlink control channel (PDCCH) with DCI formats containing a carrier indicator field (CIF),
   wherein the first DCI set comprises a set of DCI formats having a first CIF size, and wherein the second DCI set comprises a set of DCI formats having a second, different CIF size.

10. The UE of claim 9, wherein the reconfigure comprises changing from the first CIF size to the second CIF size, and wherein the first CIF size or the second CIF size may be equal to zero.

11. The UE of claim 9, wherein at least one common DCI format size is included in both the first DCI set and the second DCI set.

12. The UE of claim 9, wherein the CIF comprises signaling bits added to at least one of the DCI formats.

13. The UE of claim 9, wherein the CIF enables signaling on the PDCCH of one carrier being aggregated to refer to radio resources of another carrier being aggregated.

14. The UE of claim 13, wherein the radio resources referred to by the signaling on the PDCCH comprise at least one of physical downlink shared channel (PDSCH) resources and physical uplink shared channel (PUSCH) resources of the another carrier.

15. The UE of claim 9, wherein the processor is further configured to:
   when a size of a DCI format in the first DCI set equals a size of a different DCI format in the second DCI set, avoid monitoring the DCI format in the second DCI set after the reconfigure until a radio resource control (RRC) message is received.

16. The UE of claim 9, wherein the processor is further configured to:
   when a size of a DCI format in the first DCI set equals a size of a different DCI format in the second DCI set, include additional padding bits for the DCI format in the second DCI set.

17. An access device comprising:
   a processor configured to:
   cause reconfiguration of a user equipment (UE), when carriers are aggregated for use by the UE, from a first downlink control information (DCI) set to a second DCI set;
   transmit a physical downlink control channel (PDCCH) with DCI formats containing a carrier indicator field (CIF),
   wherein the first DCI set comprises a set of DCI formats having a first CIF size, and wherein the second DCI set comprises a set of DCI formats having a second, different CIF size.

18. The access device of claim 17, wherein the CIF comprises signaling bits added to at least one of the DCI formats.

19. The access device of claim 17, wherein the CIF enables signaling on the PDCCH of one carrier being aggregated to refer to radio resources of another carrier being aggregated.

20. The access device of claim 19, wherein the radio resources referred to by the signaling on the PDCCH comprise at least one of physical downlink shared channel (PDSCH) resources and physical uplink shared channel (PUSCH) resources of the another carrier.

21. The access device of claim 17, wherein the processor is further configured to add signaling bits to the CIF of one of the DCI formats for a resource grant.

22. The access device of claim 21, wherein the signaling bits allow signaling on a PDCCH monitoring carrier to refer to resources on a different carrier.

* * * * *